United States Patent
Iwasaki

(10) Patent No.: US 7,341,083 B2
(45) Date of Patent: Mar. 11, 2008

(54) PNEUMATIC RADIAL TIRE WITH TREAD HAVING BLOCKS PROVIDED WITH SIPES

(75) Inventor: Shizuo Iwasaki, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 108 days.

(21) Appl. No.: 10/500,244

(22) PCT Filed: Dec. 26, 2002

(86) PCT No.: PCT/JP02/13621

§ 371 (c)(1),
(2), (4) Date: Jun. 25, 2004

(87) PCT Pub. No.: WO03/055698

PCT Pub. Date: Jul. 10, 2003

(65) Prior Publication Data

US 2005/0016652 A1    Jan. 27, 2005

(30) Foreign Application Priority Data

Dec. 26, 2001    (JP) ............................. 2001-394550

(51) Int. Cl.
*B60C 11/12* (2006.01)
(52) U.S. Cl. ........................... 152/209.18; 152/209.22; 152/902; 152/DIG. 3
(58) Field of Classification Search .......... 152/209.18, 152/209.22, 209.25, 902, DIG. 3
See application file for complete search history.

(56) References Cited

U.S. PATENT DOCUMENTS 5,287,905 A * 2/1994 Caretta et al. ......... 152/DIG. 3
5,591,280 A * 1/1997 Asano ................... 152/DIG. 3
5,814,169 A * 9/1998 Yamaguchi et al. ... 152/DIG. 3

FOREIGN PATENT DOCUMENTS

| EP | 333 397 A2 | 9/1989 |
| JP | 62-241712 | * 10/1987 |
| JP | 63-137003 A | 6/1988 |

(Continued)

OTHER PUBLICATIONS

Machine translation for Japan 2000-25520, Jul. 2006.*

(Continued)

*Primary Examiner*—Steven D. Maki
(74) *Attorney, Agent, or Firm*—Sughrue Mion, PLLC

(57) ABSTRACT

A wheel tread part 2 of a tread is constituted of a longitudinal main groove 3 formed in a circumferential direction via a center of a width direction, a plurality of longitudinal subgrooves 4 formed on both side parts of the longitudinal main groove 3 in the circumferential direction, and a plurality of traverse grooves 5 formed in a width direction to intersect the longitudinal main and subgrooves 3, 4, and divided into a plurality of blocks 6. Each of the plurality of blocks 6 is provided with a one-end-open sipe 9, and formed so that rigidity in the width direction can be higher in an end a of a center side region compared with an end b of a shoulder side region. Since the rigidity of the end a of the center side region is higher, a reaction force is generated in accordance with a steering angle from the start of changing the same.

2 Claims, 2 Drawing Sheets

FOREIGN PATENT DOCUMENTS

| | | | |
|---|---|---|---|
| JP | 2-200503 | * | 8/1990 |
| JP | 3-92403 A | | 4/1991 |
| JP | 9-109613 A | | 4/1997 |
| JP | 10-000904 | * | 1/1998 |
| JP | 2000-168316 A | | 6/2000 |
| JP | 2000-185526 | * | 7/2000 |
| JP | 2000-255220 A | | 9/2000 |

OTHER PUBLICATIONS

Derwent Abstract for Japan 2000-255220, Jul. 2006.*
International Search Report, Apr. 2003.

* cited by examiner

PNEUMATIC RADIAL TIRE WITH TREAD HAVING BLOCKS PROVIDED WITH SIPES

TECHNICAL FIELD

The present invention relates to a pneumatic radial tire which includes an improved tread pattern.

BACKGROUND ART

In order to increase drainage efficiency of a tire in the rain and thereby to exhibit excellent hydroplaning performance, it is effective to dispose a circumferential groove on a wheel tread part of a tread.

In a pneumatic radial tire in this case, the wheel tread part of the tread is constituted of at least one circumferential groove formed in a circumferential direction and a plurality of transverse grooves formed at proper intervals in a width direction so as to intersect the circumferential groove which divide the wheel tread part into a plurality of block. The circumferential groove functions to increase drainage efficiency of the tire in the rain.

However, the conventional pneumatic radial tire has a problem that the disposition of the circumferential groove generates a dead zone at the start of changing a steering angle, and especially there is a fear of slight deterioration of a response of handling performance during lane changing.

Incidentally, the followings are available as prior art document information related to this application:

Japanese Patent Application Laid-Open No. 2000-185526
Japanese Patent Application Laid-open No. Hei 9-109613

DISCLOSURE OF THE INVENTION

An object of the present invention is to provide a pneumatic radial tire which can improve a response of handling performance without sacrificing hydroplaning performance.

In order to achieve the aforementioned object, the present invention provides a pneumatic radial tire in which a wheel tread part of a tread which is divided into a plurality of block and is constituted of at least one circumferential groove formed in a circumferential direction and a plurality of traverse grooves formed at proper intervals in a width direction so as to intersect the circumferential groove, is characterized in that each of the plurality of blocks is provided with at least one sipe which intersects the circumferential direction, and is formed so that block rigidity can be higher in an end of a center side region compared with an end of a shoulder side region.

According to the invention, it is possible to maintain drainage efficiency of the tire at a high level by the circumferential groove in the rain. In addition, since the block rigidity of the center side is high, a reaction force can be generated in accordance with a steering angle from the start of changing the same.

Moreover, the block rigidity of the width direction can be easily controlled based on a length, a cut depth, and a cut area of a sipe disposed in the width direction, and/or the number of set sipes.

Additionally, according to a preferred embodiment of the present invention, the circumferential groove is constituted by including a longitudinal main groove formed in the circumferential direction via a center of the width direction, and a pair of longitudinal subgrooves disposed by at least one on each of both sides of the longitudinal main groove and, at least four rows of the plurality of blocks are disposed along the longitudinal main and subgrooves.

Thus, by one longitudinal main groove and at least a pair of longitudinal subgrooves, it is possible to secure a groove volume necessary for maintaining the drainage efficiency of the tire at the high level in the rain.

Additionally, a block section along the sipe may be formed so that a cut depth in the end of the center side region can be shallower compared with that of the end of the shoulder side region.

Thus, since the cut depth of the sipe is shallow in the end of the center side region, it is possible to increase block rigidity of the end of the center side region compared with that of the end of the shoulder side region by a corresponding amount.

Moreover, a block section along the sipe may be formed so that a cut area of the end of the center side region can be smaller compared with that of the end of the shoulder side region.

Thus, since the cut area of the sipe is small on the end side of the center side region, it is possible to increase block rigidity of the end of the center side region compared with that of the end of the shoulder side region by a corresponding amount.

Further, a block section along the sipe may be formed so that a ratio between a sipe sectional area S2 of the shoulder side region and a sipe sectional area S1 of the center side region can be as follows:

$$1.4 \leq S2/S1 \leq 2.0$$

When the sipe sectional area ratio S2/S1 drops below 1.4, a reaction force in accordance with a steering angle is weakened from the start of changing the same because of a small difference in block rigidity between the shoulder side and the center side. On the other hand, when the sipe sectional area ratio S2S1 exceeds 2.0, the sipe sectional area of the center side is reduced too much to obtain original sipe effects. Thus, maximum effects can be obtained when the sipe section is formed so as to set its area ratio S2/S1 to be between 1.4 and 1.0.

Furthermore, the sipe may be constituted of a one-end-open sipe formed by opening the shoulder side of the block and terminating the center side in the block.

Thus, a part where no sipe has been formed is left in the end of the center side region, and it is accordingly possible to increase block rigidity of the end of the center side region compared with that of the end of the shoulder side region.

Still furthermore, a width of an unopened part of the end of the center side region may be 5 to 15% of a block width.

When the width of the unopened part of the end of the center side region drops below 5% of the block width, a reaction force which corresponds to a steering angle is weakened from the start of changing the same because of a small difference in block rigidity between the shoulder side and the center side. When the width of the unopened part of the end of the center side region exceeds 15% of the block width, the sipe sectional area of the center side is reduced too much to obtain original sipe effects. Therefore, maximum effects can be obtained by setting the width of the unopened part of the end of the center side region within a range of 5 to 15% of the block width.

In addition, the sipe may be constituted of a both-end-open sipe formed by opening both ends of the shoulder and center sides of the block.

It is possible to improve wet performance by constituting the sipe of the both-end-open sipe.

Moreover, the both-end-open sipe may be formed by including an end of the center side region having a width of 5 to 40% of the block width and a shallow cut depth.

By forming the end of the center side region having the shallow cut depth to be 5 to 40% of the block width, it is possible to obtain desired reaction force in accordance with a steering angle without sacrificing wet performance which is an original sipe effect.

When the end of the center side region having the shallow cut depth is formed to be less than 5% of the width of the block width, a reaction force in accordance with a steering angle becomes too small to be regarded as a response. On the other hand, when the end is formed to exceed 40% of the block width, it is impossible to exhibit original sipe effects.

BEST MODE FOR CARRYING OUT THE INVENTION

Hereinafter, an embodiment of the present invention will be described with reference to the accompanying drawings.

Figure 1:
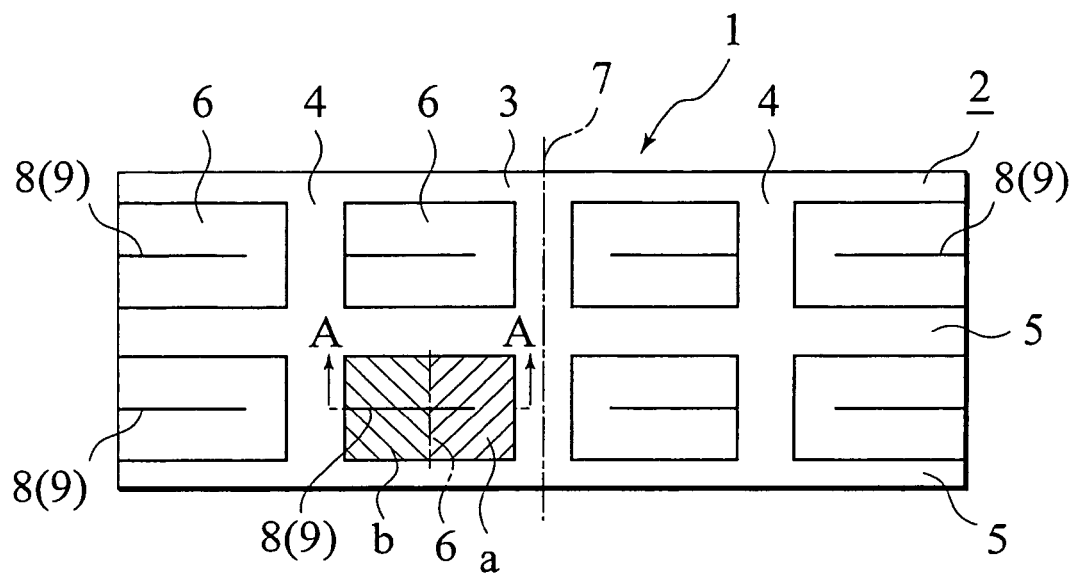
FIG. 1 is a partial view of a typical tread pattern of a pneumatic radial tire according to an embodiment of the present invention.
Figure 2:
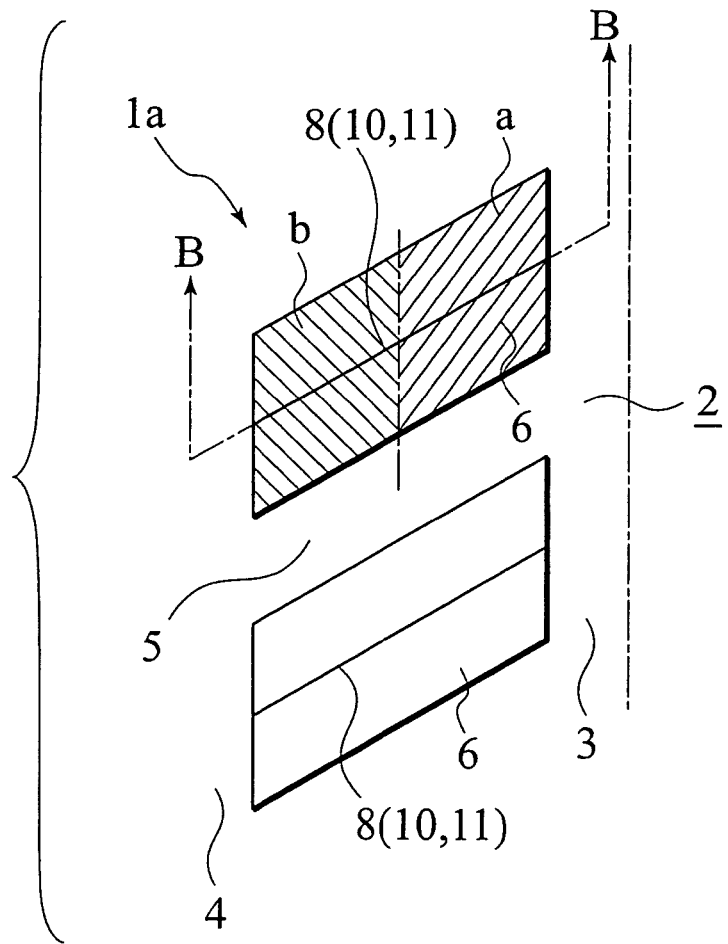
FIG. 2 is a partial view of the other typical tread pattern of the pneumatic radial tire according to the embodiment of the invention.

FIGS. 1 and 2 show tread patterns 1 and 1a of a pneumatic radial tire according to an embodiment of the present invention.

In the pneumatic radial tire according to the present invention, a wheel tread part of a tread is constituted of at least one circumferential groove formed in a circumferential direction and a plurality of traverse grooves formed at proper intervals in a width direction to intersect the circumferential groove, and divided into a plurality of blocks.

According to the embodiment, in the pneumatic radial tire, as shown in tread patterns 1 and 1a, a wheel tread part 2 of a tread is constituted of a longitudinal main groove (circumferential groove) 3 formed in a circumferential direction via a center of a width direction, a plurality of longitudinal subgrooves (circumferential grooves) 4 and 4 formed on both sides of the longitudinal main groove 3 in the circumferential direction, and a plurality of traverse grooves 5 formed at proper intervals in the width direction to intersect the longitudinal main and subgrooves 3 and 4, and divided into a plurality of blocks 6.

Each of the plurality of blocks 6 is provided with at least one sipe 8 which intersects the circumferential direction, and formed so that rigidity of the block 6 in the width direction can be higher in an end a of a center side region (right hatched part in each of FIGS. 1 and 2) compared with that in an end b of a shoulder side region (left hatched part in each of FIGS. 1 and 2). The end a of the center side region and the end b of the shoulder side region are regions divided into the center and shoulder sides at a boundary of a center of the block 6 in the width direction for convenience.

Specifically, in the tread pattern 1, the longitudinal main groove 3 is formed along a tire equatorial plane 7, the longitudinal subgrooves 4 are formed in parallel with the longitudinal main groove 3, and the traverse groove 5 is formed orthogonally to the longitudinal main and subgrooves 3 and 4 (FIG. 1). Alternatively, in the tread pattern 1a, the longitudinal main groove 3 is formed along the tire equatorial plane 7, the longitudinal subgrooves 4 are formed in parallel with the longitudinal main groove 3, and the traverse groove 5 is formed so as to obliquely cross the longitudinal main and subgrooves 3 and 4 (FIG. 2).

In the pneumatic radial tire constituted in such a manner, tire drainage efficiency can be maintained at a high level in the rain by the longitudinal main and subgrooves 3 and 4. In addition, the rigidity of the block 6 is high on the center side (end a of the center side region), a reaction force is generated in accordance with a steering angle from the start of changing the same. Hence, the maintenance of the drainage efficiency at the high level enables to secure hydroplaning performance. Moreover, accurate transmission of the reaction force in accordance with the steering angle to a driver is realized, whereby it becomes possible to improve a response of handling performance.

Further, the rigidity of the block 6 in the width direction can be easily controlled by a length and a cut depth of the sipe 8 disposed in the width direction, and/or the number of sipes to be set.

Furthermore, as shown in FIG. 1, it is preferable that the longitudinal subgrooves 4 are formed by at least one in each of both sides of the longitudinal main groove 3 and at least four rows of the plurality of blocks 6 are disposed along the longitudinal main and subgrooves 3 and 4.

According to such a constitution, it is possible to secure a groove volume necessary for maintaining the tire drainage efficiency at the high level in the rain by one longitudinal main groove 3 and at least a pair of longitudinal subgrooves 4, 4. Moreover, it is also possible to secure good hydroplaning performance.

Figure 3:
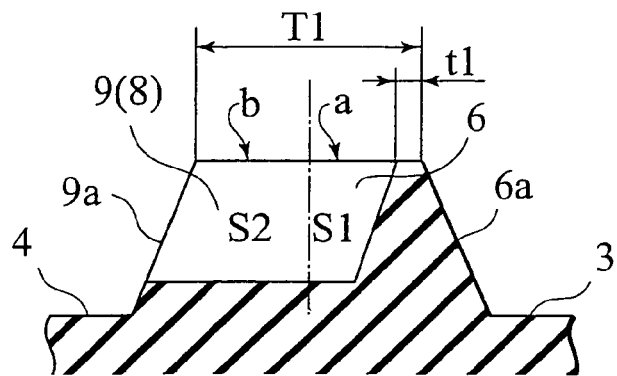
FIG. 3 is a cross sectional view of a block cut along the line A-A of FIG. 1.
Figure 4:
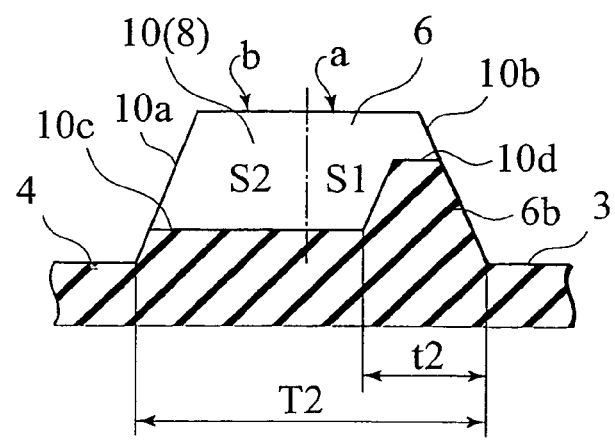
FIG. 4 is a cross sectional view of a block cut along the line B-B of FIG. 2.
Figure 5:
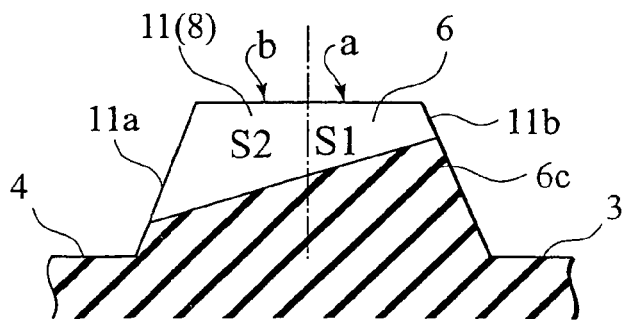
FIG. 5 is a cross sectional view of the other block cut along the line B-B of FIG. 2.

In addition, as shown in FIGS. 3 to 5, the sipe 8 is constituted of a one-end-open sipe 9 (FIGS. 1 and 3) in which the shoulder side is open and the center side is terminated in the block 6, or both-end-open sipes 10 and 11 (FIGS. 2, 4 and 5) formed so that a cut depth in the end a of the center side region becomes shallower compared with that in the end b of the shoulder side region.

The one-end-open sipe 9 shown in FIGS. 1 and 3 has an opening 9a on the longitudinal subgroove 4 side (shoulder side), and formed to terminate in the block 6 while the cut depth thereof is maintained constant at a deepest.

According to this constitution, a part (projected part) 6a where no sipe 9 has been formed is left in the end a of the center side region. Thus, rigidity in the end a of the center side region can be set higher compared with that in the end b of the shoulder side region. Moreover, it is possible to improve a response of handling performance.

Preferably, as shown in FIG. 3, the projected part 6a is formed so that its top width t1 can be 5 to 15% of a top width T1 of the block 6. Here, T1 denotes a width of the top of the block 6 in the tread width direction, and t1 denotes a width of the top of the projected part 6a in the tread width direction.

According to this constitution, by setting the top width t1 of the projected part 6a to be in the range of 5 to 15% of the top width T of the block 6, a desired reaction force is obtained in accordance with a steering angle without sacrificing wet performance which is an original effect of the sipe 9. Moreover, it is possible to improve a response of handling performance without sacrificing hydroplaning performance. When the width t1 of the part (projected part) 6a of the unopened end of the center side region drops below 5% of the block width, a reaction force corresponding to a steering angle is weakened from the start of changing the same because of a small difference in block rigidity between the shoulder side and the center side. When the width t1 of the part (projected part) 6a of the unopened end of the center side region exceeds 15%, a sipe sectional area of the center side is reduced too much to obtain original sipe effects. Hence, maximum effects can be obtained by setting the width t1 of the part (projected part) 6a of the unopened end of the center side region to be in the range of 5 to 15% of the block top width T1.

Additionally, the both-end-open sipe 10 is formed by including a one-end opening 10a on the longitudinal sub-groove 4 side and the other-end opening 10b on the longitudinal main groove 3 side which is provided by setting a cut dept to be shallower stepwise toward the longitudinal main groove 3. According to the embodiment, the both-end-open sipe 10 is formed into one step to include a deepest part 10c formed to be communicated with the one-end opening 10a and to have a depth equal to the cut depth of the sipe 9 and a shallowest part 10d formed to be communicated with the other-end opening 10b.

According to this constitution, a projected part 6b, of which the shallowest part 10d is a top, is formed in the end a of the center side region. Thus, rigidity in the end a of the center side region can be set higher compared with that in the end b of the shoulder side region. Moreover, it is possible to improve a response of handling performance.

Preferably, as shown in FIG. 4, the both-end-open sipe 10 is formed by including an end a of the center side region, in which a width t2 is 5 to 40% of a base part width T2 of the block 6, having a shallow cut depth. Here, as shown in FIG. 4, T2 denotes a width of the base part of the block 6 in the tread width direction, and t2 denotes a width of the base part of the projected part 6b in the tread width direction.

According to this constitution, the end a of the center side region with the shallow cut depth is formed to have the width t2 which is 5 to 40% of the block base part width T2. Thus, a desired reaction force can be obtained in accordance with a steering angle without sacrificing wet performance which is an original effect of the sipe 10. Moreover, it is possible to improve a response of handling performance without sacrificing hydroplaning performance.

When the end a of the center side region of the shallow cut depth is formed to have a width t2 which is less than 5% of the block base part width T2, a reaction force in accordance with a steering angle is too small to be regarded as a response. Conversely, when the end a is formed to have a width which exceeds 40% of the block top width T, it is impossible to exhibit original effects of the sipe 10.

In addition, the both-end-open sipe 11 is formed by including a one-end opening 11a and the other-end opening 11b formed to sizes roughly equal to the one-end and other-end openings 10a and 10b of the aforementioned both-end opening sipe 10, respectively, in the same places. Moreover, a cut depth of the both-end-open sipe 11 is formed to be gradually shallower from the one-end opening 11a toward the other-end opening 11b.

According to this constitution, since the cut depth of the end a of the center side region is shallow, a mountain part 6c is formed to be gradually higher toward the longitudinal main groove 3. Thus, rigidity of the end a of the center side region can be higher compared with that of the end b of the shoulder side region. Moreover, it is possible to improve a response of handling performance.

Moreover, the rigidity of the block 6c an be controlled by changing a size of a cut area of the sipe 8 (9, 10, and 11).

That is, as shown in FIGS. 1 and 2, the cut area of the sipe 8 can be controlled by adjusting a depth or the like thereof so that the cut area of the sipe 8 in the tread width direction can be smaller in the end a of the center side region than that in the end b of the shoulder side region when seen from sections of the block 6 (sections cut along the lines A-A and B-B) along the cut surface of the sipe 8.

Thus, as shown in FIGS. 3 to 5, the sipe 8 (9, 10, and 11) is formed to have the cut area smaller in the end a of the center side region than that in the end b of the shoulder side region. According to this constitution, as in the case of the aforementioned means for making the cut area of the sipe 8 shallower, the block rigidity of the end a of the center side region can be higher compared with that of the end b of the shoulder side region by an amount corresponding to the smaller cut area of the sipe 8 on the end a side of the center side region. A sipe sectional area ratio for the cut area of the sipe 8 in the tread width direction (sipe cut area) is represented by a ratio between a sipe sectional area S1 of the center side region and a sipe sectional area S2 of the shoulder side region.

Next, Table 1 shows a result of a real car test.

TABLE 1

| | Sipe | Sipe sectional area ratio (S1:S2) | Real car performance handling score |
|---|---|---|---|
| Example 1 | One-end-open sipe 9 (see FIG. 3) | 1:1.89 | 7 |
| Example 2 | Both-end-open sipe 10 (see FIG. 4) | 1:1.45 | 6.5 |
| Example 3 | Both-end-open sipe 11 (see FIG. 5) | 1:1.52 | 6.5 |
| Conventional example | Both-end-open sipe 12 (see FIG. 6) | 1:1.00 | 5 |

In the real car test, checking was made on effects of a response of handling performance especially during lane changing by using a tire of 215/65R15 and changing a shape of a sipe.

Figure 6:
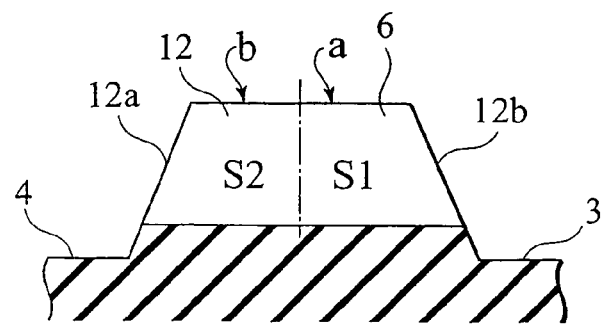
FIG. 6 is a cross sectional view of a block of a tire used as a comparative article in a real car test.

In the Example 1, a one-end-open sipe 9 (see FIG. 3) was formed. In the Example 2, a both-end-open sipe 10 (see FIG. 4) was formed by including an end a of a center side region, in which a width t2 was 5 to 40% of a block base part width T2, having a shallow cut depth. In the Example 3, a both-end-open sipe 11 (see FIG. 5) was formed. In the conventional example, as shown in FIG. 6, a both-end-open sipe 12 (a one-end opening 12a on a longitudinal subgroove 4 side and the other-end opening 12b on a longitudinal main groove 3 side are equal to each other in size) is formed to have a uniform cut depth equal to a deepest part of each of the Examples 1, 2, and 3.

Additionally, in a real car performance test, through driving by a professional driver, responses were evaluated by 10-point grading system based on feelings when a steering angle was very small. A larger score indicates better performance.

As can be understood by the Table 1, higher scores were obtained for the Examples 1, 2, and 3 than the conventional example. Additionally, for the sipe, even in the case of similar both-end-open sipes, it is possible to improve responses of handling performance in the order of both-end-open sipe 12<both-end-open sipe 11<both-end-open sipe 10.

Furthermore, according to the present invention, one sipe 8 is disposed for each block 6. However, the invention is not limited to this constitution. Two or more sipes can be disposed depending on a size of the block 6 and/or design of a tread pattern.

Next, Table 2 shows a result of a real car test conducted similarly to the above by using a tire which has a one-end-open sipe shown in FIG. 3.

TABLE 2

| | Sipe | Sipe sectional area ratio (S1:S2) | Real car performance handling score |
|---|---|---|---|
| Example 4 | One-end-open sipe (see FIG. 3) | 1:1.4 | 6.5 |
| Example 5 | One-end-open sipe (see FIG. 3) | 1:2.0 | 7 |
| Comparative Example 1 | One-end-open sipe (see FIG. 3) | 1:1.3 | 5.5 |
| Comparative Example 2 | One-end-open sipe (see FIG. 3) | 1:2.1 | 8 |

As shown in the Table 2, in the Comparative Example 1 in which the sipe sectional area ratio S2/S1 is 1.3, a reaction force in accordance with a steering angle is weakened from the start of changing the same because of a small difference in block rigidity between the shoulder side and the center side. As a result, a handling score becomes low, which is 5.5. On the other hand, in the Comparative Example 2 in which the sipe sectional area ratio S2/S1 is 2.2, while a handling score is high, which is 8, a sipe sectional area of a center side is reduced too much to obtain an original sipe effect.

Therefore, as shown in the Examples 4 and 5, balance is kept between handling performance (6.5, 7) and a sipe effect based on formation in which a sipe sectional area ratio is $1.4 \leq S2/S1 \leq 2.0$, whereby maximum effects can be obtained.

Next, Table 3 shows a result of a real car test conducted similarly to the above by using a tire which has a one-end-open sipe of FIG. 3.

TABLE 3

| | Sipe | Ratio of block width of unopened part t1/T1 (%) | Real car performance handling score |
|---|---|---|---|
| Comparative Example 3 | One-end-open sipe 9 (see FIG. 3) | 4 | 5.5 |
| Example 6 | One-end-open sipe (see FIG. 3) | 5 | 6.5 |
| Example 7 (Example 1) | One-end-open sipe (see FIG. 3) | 8 | 7 |
| Example 8 | One-end-open sipe (see FIG. 3) | 15 | 7.5 |
| Comparative Example 4 | One-end-open sipe (see FIG. 3) | 16 | 8 |

In the Table 3, when a ratio t1/T1 of a block width of the unopened part is 4% (Comparative Example 3), a reaction force in accordance with a steering angle is too small to be regarded as a response. Thus, a handling score becomes low, which is 5.5. On the other hand, when a ratio t1/T1 of a block width of the unopened part is 16% (Comparative Example 4), while a handling score becomes high, which is 8, original sipe effects cannot be obtained. Therefore, as shown in the Examples 6, 7 and 8, by the formation in which the ratio t1/T1 of the block width of the unopened part is in a range of 5 to 15%, it is possible to obtain a desired reaction force in accordance with a steering angle without sacrificing wet performance which is an original sipe effect. Moreover, it is possible to improve a response of handling performance without sacrificing hydroplaning performance.

INDUSTRIAL APPLICABILITY

The following effects can be obtained by providing the pneumatic radial tire of the present invention.

That is, according to the present invention, the drainage efficiency of the tire can be maintained at a high level in the rain by the circumferential groove, whereby it is possible to secure hydroplaning performance. Moreover, since the block rigidity of the end of the center side region is high, a reaction force is generated in accordance with a steering angle from the start of changing the same, and this reaction force is accurately transmitted to a driver. As a result, it is possible to improve a response of handling performance.

By one longitudinal main groove and at least a pair of longitudinal subgrooves, it is possible to secure a groove volume necessary for maintaining the drainage efficiency of the tire at a high level in the rain. Thus, it is possible to secure higher hydroplaning performance.

Moreover, it is possible to increase the block rigidity of the end of the center side region compared with that of the shoulder side region by an amount corresponding to the shallow end of the center side region. Thus, effects similar to the above can be exhibited.

In addition, it is possible to increase the block rigidity of the end of the center side region compared with that of the end of the shoulder side region by an amount corresponding to the small cut area of the sipe on the end side of the center side region. Thus, effects similar to the above can be exhibited.

Further, the block section along the sipe is formed such that the ratio between the sipe sectional area S2 of the shoulder side region and the sipe sectional area S1 of the center side region can be $1.4 \leq S2/S1 \leq 2.0$. Thus, maximum effects can be obtained.

A part where no sipe has been formed is left in the end of the center side region, whereby the block rigidity of the end of the center side region can be increased compared with that of the end of the shoulder side region. Thus, it is possible to improve the response of handling performance more.

A width of the unopened part of the end of the center side region is formed to be in a range of 5 to 15% of the block width. Thus, maximum effects can be obtained.

Moreover, it is possible to secure better hydroplaning performance by constituting the sipe of the both-end-open sipe.

Furthermore, in the constitution of the both-end-open sipe, the end of the center side region having the shallow cut depth is formed to have a width of 5 to 40% of the block base part width. Thus, it is possible to accurately obtain a desired reaction force in accordance with a steering angle without sacrificing wet performance which is an original sipe effect. As a result, it is possible to exhibit high-level wet performance, and to improve the response of handling performance more.

The invention claimed is:

1. A pneumatic radial tire comprising:

a wheel tread part being divided into a plurality of blocks and including at least one circumferential groove formed in a circumferential direction and a plurality of traverse grooves formed at proper intervals in a width direction so as to intersect the circumferential groove, wherein each of the plurality of blocks is provided with at least one sipe which intersects the circumferential direction, wherein a cut depth of the sipe changes in the width direction, wherein, the block is divided in the width direction into a shoulder side region and a center side region by a center line of the block, a ratio between a sipe sectional area S2 of the shoulder side region and a sipe sectional area S1 of the center side region is as follows:

$1.4 \leq S2/S1 \leq 2.0$ so that block rigidity is higher in an end of the center side region compared with that in an end of the shoulder side region, wherein the sipe is constituted of a one-end-open sipe formed by opening the shoulder side of the block and terminating the center side in the block, and wherein a width of an unopened part of the end of the center side region is 5 to 15% of a block width.

2. A pneumatic radial tire comprising:

a wheel tread part being divided into a plurality of blocks and including at least one circumferential groove formed in a circumferential direction and a plurality of traverse grooves formed at proper intervals in a width direction so as to intersect the circumferential groove, wherein each of the plurality of blocks is provided with at least one sipe which intersects the circumferential direction, wherein a cut depth of the sipe changes in the width direction, wherein, the block is divided in the width direction into a shoulder side region and a center side region by a center line of the block, a ratio between a sipe sectional area S2 of the shoulder side region and a sipe sectional area S1 of the center side region is as follows:

$1.4 \leq S2/S1 \leq 2.0$ so that block rigidity is higher in an end of the center side region compared with that in an end of the shoulder side region, wherein the sipe is constituted of a both-end-open sipe formed by opening both ends of the shoulder and center sides of the block, and wherein an end of the sipe in the center side region has a shallow cut depth, and a base of the shallow cut depth end of the sipe has a width of 5 to 40% of the block width.

* * * * *